US005575916A

United States Patent [19]
Brian et al.

[11] Patent Number: 5,575,916
[45] Date of Patent: Nov. 19, 1996

[54] METHOD OF PROCESSING A CHEESE PROCESSING WASTE STREAM

[75] Inventors: Barry Brian, Dresher; David A. Zopf, Strafford; Lei Lu, North Wales; John P. McCauley, Jr., Folcroft; Michael Partsch, Horsham, all of Pa.

[73] Assignee: Neose Pharmaceuticals, Inc., Horsham, Pa.

[21] Appl. No.: 337,181

[22] Filed: Nov. 7, 1994

[51] Int. Cl.$^6$ ................................................ B01D 11/04
[52] U.S. Cl. ......................................................... 210/634
[58] Field of Search ................................... 210/634, 645; 426/41, 429, 431, 491, 582, 801; 127/46.1, 46.2

[56] References Cited

U.S. PATENT DOCUMENTS

| | | | |
|---|---|---|---|
| 4,001,198 | 1/1977 | Thomas | 260/112 R |
| 4,202,909 | 5/1980 | Pederson, Jr. | 426/239 |
| 4,543,261 | 9/1985 | Harmon et al. | 426/271 |
| 4,547,386 | 10/1985 | Chambers et al. | 426/583 |
| 4,617,861 | 10/1986 | Armstrong | 99/453 |
| 4,771,001 | 9/1988 | Bailey et al. | 426/41 |
| 4,855,056 | 8/1989 | Harju et al. | 210/638 |
| 4,964,995 | 10/1990 | Chum et al. | 210/634 |
| 4,968,521 | 11/1990 | Melnychyn | 426/583 |
| 4,971,701 | 11/1990 | Harju et al. | 210/638 |
| 5,118,516 | 6/1992 | Shimatani et al. | 426/271 |
| 5,270,462 | 12/1993 | Shimatani et al. | 426/801 |

OTHER PUBLICATIONS

Patent Abstracts of Japan, JP-A-03 143 351, Jun. 18, 1991.
Patent Abstracts of Japan, JP-A-59 184 197, Oct. 19, 1984.
Patent Abstracts of Japan, JP-02 237 992, Sep. 20, 1990.
Patent Abstracts of Japan, JP-A-01 168 693, Jul. 4, 1989.

*Primary Examiner*—Ivars Cintins
*Attorney, Agent, or Firm*—Oblon, Spivak, McClelland, Maier & Neustadt, P.C.

[57] ABSTRACT

A method of processing a cheese processing waste stream generated in a cheese-making process is described comprising:

i) contacting a cheese processing waste stream with a solvent and extracting a sialyloligosaccharide with said solvent;

ii) separating a sialyloligosaccharide containing solvent from said cheese processing waste stream; and iii) isolating a sialyloligosacchride from said sialyloligosaccharide containing solvent.

16 Claims, No Drawings

METHOD OF PROCESSING A CHEESE PROCESSING WASTE STREAM

BACKGROUND OF THE INVENTION

1. Field of the Invention

This invention relates to a method of processing a cheese processing waste stream.

2. Discussion of the Background

Whey is a major by-product of cheese making, which, for environmental reasons, presents a difficult waste disposal problem. Whey is typically composed of about 5 wt. % lactose, 1 wt. % protein and about 0.5 wt. % salts, where the balance of the mixture is water. While the protein component can often be recovered by ultra-filtration, and accordingly used in food products, the lactose component has heretofore been of little value.

Even though major cheese making countries continue to explore methods for disposing and utilizing fluid whey, the magnitude of the waste disposal problem requires that improved disposal methods be developed. In 1993 it was estimated by the Dairy Products Annual, USDA that over 62.6 billion pounds of fluid whey were produced in the United States alone. Conventional disposal methods for fluid whey include use as fertilizer, use as a liquid animal feed, use in food products, drying and dumping.

Thomas U.S. Pat. No. 4,001,198 reports a method of recovering nutrients from cheese whey by multiple ultrafiltration steps, in which proteins, lactose and small molecular weight molecules are successively removed. The remaining permeate is then oxygenated to lower the biological oxygen and chemical oxygen demands, so that the permeate can be dumped safely.

Chambers et al. U.S. Pat. No. 4,547,386 report the preparation of animal feed blocks from whey, in which whey is concentrated to a solids content of at least 45%, followed, by addition of a divalent cation, to promote gelling of the structure.

Melnychyn U.S. Pat. No. 4,968,521, reports the use of fluid milk by-products as an extraction solvent for raw vegetable material in the production of a new human food or animal feed.

Armstrong U.S. Pat. No. 4,617,861 reports the processing of cheese whey by separation of the whey proteins, followed by fermentation of lactose to produce ethanol and fermentation solubles. The protein fraction is used as a food source, the ethanol as an industrial fuel and the fermentation solubles as an animal feed supplement.

Pederson, Jr. U.S. Pat. No. 4,202,909 reports using ultrafiltration to reduce the mineral content of cheese whey, thereby making it easier to obtain relatively high purity lactose.

Harju et al. U.S. Pat. Nos. 4,971,701 and 4,855,056 report the demineralization of cheese whey by means of a four-compartment electrolytic cell.

Harmon et al. U.S. Pat. No. 4,543,261 report the separation of soluble salts from non-ionic low molecular weight organic compounds, by passing an aqueous liquid through a bed of a gel-type strongly acidic cation exchange resin.

Shimatani et al. U.S. Pat. No. 5,118,516 report the isolation of sialic acid-containing lactose, from whey, skim milk or a deproteinized solution by (a) electrodialysis, or (b) ion exchange by a cation-exchange resin and a strongly basic anion-exchange resin, or (c) a combination of electrodialysis and ion exchange by the cation-exchange resin and the strongly basic anion-exchange resin to desalt the permeate.

Shimatani et al. U.S. Pat. No. 5,270,462 report a process of manufacturing a composition containing a high concentration of sialic acids, by adjusting the pH of cheese whey to be acidic, contacting the whey with a cation exchanger, followed by concentrating and desalting the eluent.

JP Kokai 01-168,693 reports the preparation of a sialic acid composition, by subjecting milk, non-fat milk, buttermilk or whey to ultrafiltration, fractionating at 20,000 to 500,000 Daltons at a pH of 4.0 to 6.0, followed by a second ultrafiltration, fractionating at 1,000 to 10,000 Daltons at a pH of 6.0 to 8.0 under 0.2 to 2.0 MPa, to remove impurities such as lactose. The residual is spray dried or lyophilized.

JP Kokai 03-143,351 reports the recovery of oligosaccharide bonding type sialic acid from an alkali cleaning waste liquid of anion exchange resin formed at desalting of whey, by neutralization, ultrafiltration, reverse osmosis, desalting, absorption of the sialic acid onto a strong basic type anion exchange resin, followed by elution, desalting and drying.

JP Kokai 59-184,197 reports the manufacture of oligosaccharides attached to sialic acids, by desalting a sialyloligosaccharide-containing molasses, passing the desalted solution through an anion exchange column, neutralizing the eluate and desalting the eluate by electrophoresis.

Accordingly, processing cheese processing waste streams by extraction of valuable components by ion-exchange chromatography have been reported. The ion-exchange based methods for removing sialyloligosaccharides from a cheese processing waste stream, suffer from the difficulty in isolating the sialyloligosaccharide from the ion-exchange column. Specifically, the absorbed sialyloligosaccharide is eluted by treatment of the column with several column volumes of an aqueous salt solution such as NaCl and NaOAc. The result is an eluent of a very dilute solution of the sialyloligosaccharide and a high concentration of salt. In order to separate the sialyloligosaccharide from the eluent, the eluent is subjected to desalting techniques such as reverse osmosis, which separates the sialyloligosaccharide from the salt. However, reverse osmosis is a slow technique and very energy intensive. Accordingly, any isolation procedure, which could avoid a desalting step by reverse osmosis would be advantageous.

Despite many creative methods of disposing of waste fluid whey, the ever increasing supply of cheese whey demands more effective waste disposal methods.

The present invention addresses this problem by providing a method of processing a cheese processing waste stream, which provides for the economic disposal of the material.

SUMMARY OF THE INVENTION

Accordingly, one object of this invention is to provide a novel method of processing a cheese processing waste stream.

A second object of this invention is to provide a novel method of processing a cheese processing waste stream which is cheese whey.

A third object of this invention is to provide a novel method of processing a cheese processing waste stream which is the solids obtained by drying cheese whey.

A fourth object of this invention is to provide a novel method of processing a cheese processing waste stream which is the mother liquor obtained by separating lactose from cheese whey.

A fifth object of this invention is to provide a novel method of processing a cheese processing waste stream which is lactose.

The objects of the present invention are provided for by a method of processing a cheese processing waste stream which comprises sequentially:

i) contacting a cheese processing waste stream with an anion exchange resin;

ii) removing said anion exchange resin from said cheese processing waste stream and eluting said anion exchange resin with an aqueous solution of a lithium salt, to produce an eluent;

iii) concentrating said eluent to form a solid of a lithium salt and a lithium salt of a cheese processing waste; and iv) washing said solid with an organic solvent, dissolving said lithium salt and leaving said lithium salt of a cheese processing waste as a solid.

It has been discovered that the lithium salt of a cheese processing waste has a low solubility in an organic solvent, while lithium salts have a high organic solvent solubility. Accordingly the eluent can be "desalted" by a simple washing away of the lithium salts from the lithium salts of a cheese processing waste with an organic solvent.

The process may further comprise removing positively charged materials prior to contacting said cheese processing waste stream with said anion exchange resin, followed by processing according to steps i) to iv).

According to a second embodiment of the present invention, a cheese processing waste stream is treated comprising sequentially:

i) contacting a cheese processing waste stream with a solvent;

ii) separating said solvent from said cheese processing waste stream; and iii) isolating an extract of a cheese processing waste stream.

It has been discovered that a cheese processing waste stream can be extracted with a solvent to obtain an extract of a cheese processing waste stream.

DETAILED DESCRIPTION OF THE PREFERRED EMBODIMENTS

The cheese processing waste stream, which is processed according to the present invention, may be obtained from any waste stream generated during a cheese making process. For example acid whey, is generated by separating the solids when skim milk is coagulated to form cottage cheese. Acid whey is characterized by a high lactic acid content. When cheese is prepared from whole milk, the remaining liquid is sweet whey, which can be further processed by evaporation to form dry whey powder. Sweet whey can also be dried, demineralized and evaporated to form demineralized whey permeate. Sweet whey can also be subjected to ultrafiltration to generate both a whey permeate and a whey permeate concentrate. Whey permeate can be further processed by crystallizing lactose to form both lactose and a mother liquor. The mother liquor resulting from crystallizing lactose from a whey permeate is known in the art as "Delac". Suitable cheese processing waste streams include colostrum, milk, milk powder, whole whey, demineralized whey permeate, the regeneration stream from demineralized whey permeate, whey permeate, crystallized lactose, spray dried lactose, whey powder, edible lactose, lactose, refined lactose and USP lactose. Preferably the aqueous mother liquor material resulting from crystallizing lactose (i.e. Delac) is used.

Fluid cheese whey is typically dried so as to produce a non-hygroscopic, highly dispersable powder. Fresh fluid whey is clarified by passing through a desludging type clarifier. The whey is separated to remove fat, then concentrated in double or triple effect evaporators to a solids content of about 62% by weight. The solids can be removed by separation at room temperature, or more preferably, the concentrated whey is cooled before the solids are removed.

When the cheese processing waste stream to be processed is the solids obtained from drying whey, the solids can be first dissolved in water, preferably in an amount of about 1 to 620 g, preferably 50 to 200 g, more preferably about 100 g of solids per Liter of water. Dissolution of the solids obtained from drying cheese whey can be conducted at room temperature or at elevated temperatures to accelerate the dissolution process and increase the amount of dissolved solids. Preferably, temperatures of from 20°–80° C. are suitable.

Alternatively, the solids can be processed directly by extraction with a solvent.

Typically the cheese processing waste stream can be utilized in the present invention, without adjusting the pH. Accordingly, there is generally no need for changing the pH of the material before it is processed according to the present invention. As such, this method can avoid the creation of even more waste, which would result if a pH adjustment were necessary. However, if the pH of the cheese processing waste stream is not compatible with the present process, the pH can be brought to within a pH range of from 2–9 through the addition of an acid, such as hydrochloric acid, sulfuric acid, acetic acid, lactic acid or citric acid, or to a pH of from 2 to 10, preferably from 3 to 9, more preferably from 4 to 6, by the addition of a base such as sodium hydroxide, ammonium hydroxide and potassium hydroxide.

Prior to treatment of the cheese processing waste stream with the anion exchange resin, the cheese processing waste stream is preferably first treated to remove whey proteins and other positively charged materials. Pretreatment to remove positively charged materials, enables the processing of a greater amount of cheese processing waste stream on the anion exchange resin, before the anion exchange resin needs to be regenerated.

Any technique known to those of ordinary skill in the art can be used to remove positively charged materials. For example one suitable technique for causing whey protein to be absorbed is by contacting with a cation exchange resin, as described by J. N. DeWitt et al (Neth. Milk Dairy J., 40:41–56 (1986)) and J. S. Ayers et al (New Zeland J. Dairy Sci. & Tech., 21:21–35 (1986)), as well as those processes described in JP Kokai 52-151200 and 63-39545 and JP 2-104246 and 2-138295.

Suitable cation exchange resins may be prepared by conventional techniques known to those of ordinary skill in the art. For example a suitable cation exchange resin may be produced from a mixture of polymerizable monofunctional and polyfunctional monomer by radical emulsion polymerization techniques, then functionalized with acidic groups such as carboxylic acid groups or sulfonic acid groups that exist in the protonated form.

The degree of crosslinking in the cation exchange resin can be chosen, depending on the operating conditions of the cation exchange column. A highly crosslinked resin offers the advantage of durability and a high degree of mechanical integrity, however suffers from a decreased porosity and a drop off in mass-transfer. A low-crosslinked resin is more fragile and tends to swell by absorption of mobile phase. A suitable resin may have from 2 to 12% crosslinking, preferably 8% crosslinking.

The particle size of the cation exchange resin is selected to allow for efficient flow of the cheese processing waste stream, while still effectively removing the positively charged materials. A suitable particle size for a column 30×18 cm is 100–200 mesh.

Suitable cation exchange resins include but are not limited to CM-Sephadex, SP-Sephadex, CM-Sepharose, S-Sepharose, CM-Cellulose, Cellulose Phosphate, Sulfoxyethyl-Cellulose, Amberlite, Dowex-50W, Dowex HCR-S, Dowex Macroporous Resin, Duolit C433, SP Trisacryl Plus-M, SP Trisacryl Plus-LS, Oxycellulose, AG 50W-X2, AG50W-X4, AG50W-X8, AG 50W-X12, AG 50W-X16, AG MP-50 Resin, Bio-Rex 70. More preferably suitable resins are DOWEX™ 50×8 (an aromatic sulfonic acid linked to a polystyrene crosslinked resin from Dow Chemical) and AMBERLYST™-15, AMBERLITE™ IR-120 AND AMBERLITE™-200 acidic resins.

The cheese processing waste stream can be contacted with the cation exchange resin, in any suitable manner which would allow the whey proteins and other positively charged materials to be absorbed onto the cation exchange resin. Preferably the cation exchange resin is loaded onto a column, and the cheese processing waste stream is passed through the column, to remove the whey proteins. An amount of cation exchange resin is selected to affect removal of the positively charged materials, and will vary greatly depending on the cheese processing waste stream being treated. Typically, when the waste stream is whey permeate, the loading ratio of cheese processing waste stream to cation exchange resin may be from 5 to 20, preferably from 8–15, more preferably from 9 to 12:1 v/v.

When contacting is effected in a column, the cheese processing waste stream is preferably passed at a rate of from 1 to 70 cm/min, preferably from 2 to 15 cm/min, more preferably at a rate of 4.6 cm/min. A suitable pressure may be selected to obtain the desired flow rate. Typically a pressure of from 0 to 100 PSIG is selected. Suitable flow rates may also be obtained by applying a negative pressure to the eluting end of the column, and collecting the eluent. A combination of both positive and negative pressure may also be used.

The temperature used to contact the cheese processing waste stream with the cation exchange resin is not particularly limited, so long as the temperature is not too high to cause decomposition of the components of the waste stream. Generally ambient room temperature of from 17° to 25° C. is used.

Alternatively, the positively charged materials can be removed by such techniques as electrophoresis, ultrafiltration, reverse osmosis or salt precipitation.

After the optional treatment of the cheese processing waste stream to remove the positively charged materials, the cheese processing waste stream is contacted with an anion exchange resin.

Suitable anion exchange resins may be prepared by conventional techniques known to those of ordinary skill in the art. For example a suitable anion exchange resin may be produced from a mixture of polymerizable monofunctional and polyfunctional monomer by radical emulsion polymerization techniques, then functionalized with strongly basic groups such as quaternary ammonium groups.

The degree of crosslinking in the anion exchange resin can be chosen, depending on the operating conditions of the anion exchange column. A suitable resin may have from 2 to 12% crosslinking, preferably 8% crosslinking.

The particle size of the anion exchange resin is selected to allow for efficient flow of the cheese processing waste stream, while still effectively removing the negatively charged materials. A suitable particle size for a column 30×18 cm is 100–200 mesh.

Suitable anion exchange resins include but are not limited to DEAE Sephadex, QAE Sephadex, DEAE Sepharose, Q Sepharose, DEAE Sephacel, DEAE Cellulose, Ecteola Cellulose, PEI Cellulose, QAE Cellulose, Amberlite, Dowex 1-X2, Dowex 1-X4, Dowex 1-X8, Dowex 2-X8, Dowex Macroporous Resins, Dowex WGR-2, DEAE Trisacryl Plus-M, DEAE Trisacryl Plus-LS, Amberlite LA-2, AG 1-X2, AG 1-X4, AG 1-X8, AG 2-X8, AG MP-1 Resin, AG 4-X4, AG 3-X4, Bio-Rex 5 and ALIQUAT-336 (tricaprylylmethylammonium chloride from Henkel Corp.). More preferably suitable anion exchange resins are DOWEX™ 1×8 (a methylbenzyl ammonium linked to a polystyrene crosslinked resin from Dow Chemical) and AMBERLYSTE™A-26, AMBERLITE™IRA 400. AMBERLITE™IRA 400, AMBERLITE™IRA 416 and AMBERLITE™IRA 910, strongly basic resins.

The cheese processing waste stream can be contacted with the anion exchange resin, in any suitable manner which would allow the negatively charged materials to be absorbed onto the anion exchange resin. Preferably the anion exchange resin is loaded onto a column, and the cheese processing waste stream is passed through the column, to absorb the negatively charged materials onto the resin.

An amount of anion exchange resin is selected to affect absorption of the negatively charged materials and will vary greatly depending on the cheese processing waste stream being treated. Typically, when the waste stream is whey permeate, the loading ratio of cheese processing waste stream to anion exchange resin is from 5 to 200, preferably from 8–15, more preferably from 9 to 12:1 v/v. When contacting is affected in a column, the cheese processing waste stream is preferably passed at a rate for from 1 to 70 cm/min, preferably from 2 to 15 cm/min, more preferably at a rate of 4.6 cm/min.

A suitable pressure may be selected to obtain the desired flow rate. Typically a pressure of from 0 to 100 PSIG is selected. Suitable flow rates may also be obtained by applying a negative pressure to the eluting end of the column, and collecting the eluent. A combination of both positive and negative pressure may also be used.

The temperature used to contact the cheese processing waste stream with the anion exchange resin is not particularly limited, so long as the temperature is not too high to cause decomposition of the components of the waste stream. Generally ambient room temperature of from 17° to 25° C. is used.

Upon contacting the eluent with the anion exchange resin, the negatively charged components of the cheese processing waste stream are absorbed onto the anion exchange resin. The materials absorbed onto the anion exchange resin are negatively charged materials from a cheese processing waste, which includes but is not limited to sialyloligosaccharides such as 3' sialyllactose, 6' sialyllactose and 6'sialyllactosamine.

It is the removal of the sialyloligosaccharides, which provides for the economical treatment and disposal of a cheese processing waste stream. As previously noted, fluid whey is being produced at a rate of about 62.6 billion pounds annually, in the United States alone. The lack of any recognized value has caused this material to be disposed of as animal feed, fertilizer or by conventional waste disposal techniques such as burying or dumping. It has been discovered that disposal of a cheese processing waste stream can be made economical, by removal of sialyloligosaccharides from the cheese processing waste stream.

Sialyloligosaccharides, such as 3' sialyllactose, 6' sialyllactose and 6'sialyllactosamine are useful as bacterial anti-adhesives, anti-infectives and as an additive for infant formula. The utility of sialic acid containing compositions is reported in U.S. Pat. No. 5,270,462. Sialyllactose is also reported as being useful in a method for treating arthritis (U.S. Pat. No. 5,164,374).

However, sialyloligosaccharides are very expensive, due to their low quantity found in natural sources. 3' sialyllactose, isolated from bovine colostrum, is sold by the Sigma Chemical Company for $60.05 per milligram. The 6' isomer, also isolated from bovine colostrum, is sold for $66.10 per milligram. It has been discovered that up to 6 grams of sialyloligosaccharides can be obtained per kilogram of cheese processing waste stream. Since cheese processing waste stream, is currently of little or no commercial value, it can be obtained inexpensively, as an industrial waste product. A kilogram of previously worthless material can be processed, to extract components worth over $60,000. In doing so, it is now economically viable to dispose of a cheese processing waste stream.

The resulting liquid, after contacting with the anion exchange resin, which contains primarily water and lactose may be dried and disposed of as animal feed, fertilizer or as a food supplement.

The anion exchange resin is then purged of the sialyloligosaccharide by eluting with an aqueous solution of a suitable salt such as sodium acetate, ammonium acetate, sodium chloride, sodium bicarbonate, sodium formate, ammonium chloride or a lithium salt such as lithium acetate, lithium bicarbonate, lithium sulfate, litium formate, lithium perchlorate, lithium chloride and lithium bromide as an eluent. Purging an anion exchange resin with an aqueous salt can be accomplished by conventional means known to those of ordinary skill in the art. The sialyloligosaccharide can also be removed from the anion exchange resin with an aqueous alkali solution, although, the concentration of the aqueous alkali must be dilute enough so as not to destroy the structure of the sialyloligosaccharide. Suitable desorbing conditions can be determined through routine experimentation.

When the eluted with an aqueous solution of lithium salts, no desalting by reverse osmosis is necessary. The entire eluent can be concentrated and dried, then the remaining solids washed with an organic solvent. The lithium salts are dissolved and the lithium salt of the sialyloligosaccharide remains as a solid. Specifically the lithium salts of 3' sialyllactose, 6' sialyllactose and 6'sialyllactosamine have been found to have very low organic solvent solubility.

The lithium salts used in the eluent should be freely soluble in water, and have a high solubility in an organic solvent. In the context of the present invention, a high solubility in an organic solvent is $\geq 1$ gm of lithium salt per mL of organic solvent, preferably $\geq 5$ gm/mL, more preferably $\geq 10$ gm/mL at the temperature the solids are being washed. Suitable lithium salts which have been found to be freely soluble in water and have a high solubility in organic solvents include, lithium acetate, lithium bicarbonate, lithium sulfate, lithium formate lithium perchlorate, lithium chloride and lithium bromide.

The organic solvent used to wash the concentrated eluent should dissolve the eluting lithium salt, yet have a low solvating effect on the lithium salt of a sialyloligosaccharide. In the context of the present invention, a low solvating effect on the lithium salt of a sialyloligosaccharide is when the solubility of the lithium salt of the sialyloligosaccharide is $\leq 0.5$ gm per mL of organic solvent, preferably $\leq 0.25$ gm/mL, more preferably $\leq 0.1$ gm/mL at the temperature the solids are being washed. Suitable solvents include but are not limited to acetone, methyl ethyl ketone, 3-pentanone, diethyl ether, t-butyl methyl ether, methanol, ethanol and a mixture thereof.

The organic solvent preferably contains $\leq 0.1\%$ wt., more preferably $\leq 0.01\%$ wt. of water, most preferably the organic solvent is anhydrous. The use of an organic solvent containing high concentrations of water, results in dissolution of the lithium salts of the sialyloligosaccharide. The temperature of the organic solvent is not particularly limited, however preferably the organic solvent is at room temperature or below, more preferably 0°–5° C.

Due to the high hygroscopicity of the lithium salts of the sialyloligosaccharide, washing of the solids are conducted under conventional conditions which are known to those of ordinary skill in the art, to limit the absorption of atmospheric moisture. For example such washing can be conducted under an inert atmosphere, in a dry box or using a Schlenk-type apparatus.

When purging the anion exchange resin, with an eluent, a suitable purging solution is 50 mM. The pH of the eluent is preferably adjusted to be from 4 to 9, more preferably from 5 to 6. Generally from 2 to 5, preferably 4 column volumes of purging solution are used to remove the sialyloligosaccharides from the anion exchange resin, preferably performed at ambient temperature. Preferably, lithium acetate is used to purge the anion exchange resin of the sialyloligosaccharides.

The sodium salt of the sialyloligosaccharide can be obtained by conventional ion-exchange techniques, known to those of ordinary skill in the art.

When an eluent other than a lithium salt is used to remove the sialyloligosaccharides from the anion exchange resin, the eluent containing the sialyloligosaccharides and the salt, can be concentrated and desalted, such as by subjecting the eluent to reverse osmosis to remove the salt from the sialyloligosaccharide. Reverse osmosis can be conducted through a membrane with a 100 to 700 Dalton molecular weight cut off, preferably a 400 Dalton nm cut-off.

Reverse osmosis is preferably conducted at a pressure of from 300–1,600 psi, more preferably from 400–600 psi, even more preferably at a pressure of 450 psi.

After the salts have been removed by reverse osmosis, the resulting material can be concentrated to provide a solid material containing sialyloligosaccharides such as 3' sialyllactose and 6' sialyllactose, which can be recrystallized from a mixture of water and organic solvents.

Preferably precipitation solvents are selected from the group of ethanol, acetone, methanol, isopropanol, diethyl ether, t-butyl methylether, ethyl acetate, hexane, tetrahydrofuran and water.

In addition, the eluent, from the anion exchange column, which contains a mixture of sialyloligosaccharides which includes 3' sialyllactose, 6' sialyllactose and 6'sialyllactosamine, can be subjected to separation of the sialyloligosaccharides contained therein, by column chromatography on a DOWEX 1×2 anion exchange resin, at pH 4 to 6 using a buffer a suitable salt such as sodium acetate, ammonium acetate or a lithium salt such as lithium acetate, lithium perchlorate, lithium chloride and lithium bromide as an eluent. A solution of lithium acetate is preferred.

Suitable anion exchange resins may be prepared by conventional techniques known to those of ordinary skill in the art as previously described.

The degree of crosslinking in the anion exchange resin can be chosen, depending on the operating conditions of the anion exchange column. A suitable resin may have from 2 to 12% crosslinking, preferably 2% crosslinking.

The particle size of the anion exchange resin is selected to allow for efficient flow of the cheese processing waste stream, while still effectively affecting chromatographic separation of the negatively charged materials. A suitable particle size for a column 20×100 cm is 200–400 mesh.

Suitable anion exchange resins include but are not limited to DEAE Sephadex, QAE Sephadex, DEAE Sepharose, Q Sepharose, DEAE Sephacel, DEAE Cellulose, Ecteola Cellulose, PEI Cellulose, QAE Cellulose, Amberlite, Dowex 1-X2, Dowex 1-X4, Dowex 1-X8, Dowex 2-X8, Dowex Macroporous Resins, Dowex WGR-2, DEAE Trisacryl Plus-M, DEAE Trisacryl Plus-LS, Amberlite LA-2, AG 1-X2, AG 1-X4, AG 1-X8, AG 2-X8, AG MP-1 Resin, AG 4-X4, AG 3-X4, Bio-Rex 5 and ALIQUAT-336 (tricaprylylmethylammonium chloride from Henkel Corp.). Preferred resins are DOWEX 1×2 (a tri-methylbenzyl ammonium linked to a polystyrene crosslinked resin from Dow Chemical) and AMBERLYST and AMBERLYTE basic resins.

The mixture of sialyloligosaccharides to be separated are subjected to column chromatography on an anion exchange resin. An amount of anion exchange resin is selected to affect separation of the different sialyloligosaccharides. Typically the loading ratio of sialyloligosaccharide to anion exchange resin is from 0.1 to 5, preferably from 0.2 to 4, more preferably 1 grams of material per liter of resin at a loading concentration of from 0 to 10 mM of salt. The chromatography is conducted at a rate of from 1 to 20 cm/h, preferably 4.6 cm/h superficial velocity. A suitable pressure may be selected to obtain the desired flow rate. Typically a pressure of from 0 to 22 PSIG is selected. Suitable flow rates may also be obtained by applying a negative pressure to the eluting end of the column, and collecting the eluent. A combination of both positive and negative pressure may also be used.

Any temperature may be used to contact the cheese processing waste stream with the anion exchange resin, so long as the temperature is not too high to cause decomposition of the components of the sialyloligosaccharides. Generally ambient room temperature of from 17° to 25° C. is used.

When the buffer eluent is a lithium salt, the individual sialyloligosaccharides can be isolated by concentrating the eluent to form a solid and washing the lithium salts away with an organic solvent. Isolation of the lithium salt of a sialyloligosaccharide from a lithium salt eluent is as previously described.

The sodium salt of the sialyloligosaccharide can be obtained by conventional ion-exchange techniques, known to those of ordinary skill in the art.

When the buffer eluent is not a lithium salt, the individual sialyloligosaccharides can be isolated by reverse osmosis techniques.

According to a second embodiment of the present invention, a cheese processing waste stream can be treated without using an ion-exchange column and without using reverse osmosis.

A cheese processing waste stream such as solid lactose or an aqueous solution of lactose can be contacted with a solvent, wherein sialyloligosaccharides are extracted.

The sialyloligosaccharides which are extracted include but are not limited to 3' sialyllactose, 6' sialyllactose and 6'sialyllactosamine.

A cheese processing waste stream can be contacted with a solvent in any suitable manner to effectively extract, by solubilization, sialyloligosaccharides.

For example solid lactose, in powder form can be packed into a column, and a solvent passed through the packed column. As the solvent passes through the column, the sialyloligosaccharides are extracted from the solid lactose. To improve the solubilization of sialyloligosaccharide, the solvent can be recirculated through the column, until an equilibrium concentration of sialyloligosaccharide is obtained in the solvent.

To improve the solubilization of sialyloligosaccharide, the solvent can be recirculated at elevated temperature, below the thermal decomposition point of the sialyloligosaccharides, preferably from 27° C. to 80° C., more preferably from 60° C. to 75° C., at ambient pressure.

A cheese processing waste stream, can also be contacted with a solvent, as a slurry or suspension of the cheese processing waste stream in the solvent. The cheese processing waste stream is mixed with the solvent, preferably in a 1:4 v/v ratio, more preferably 1:3 v/v. The slurry or suspension is then stirred until the sialyloligosaccharides are solubilized in the solvent.

The ratio of cheese processing waste stream to solvent is selected so as to maximize the amount of recovered sialyloligosaccharide and minimize the amount of solvent used. Due to the high solubility of sialyloligosaccharides in the solvent chosen, the amount of solvent is typically much less than the volume of cheese processing waste stream. Accordingly when lactose is being processed, it is not necessary for the lactose to be completely dissolved.

The suspension can be stirred at any temperature, below the thermal decomposition point of the sialyloligosaccharides, preferably from 4° C. to 80° C. more preferably from 4°–27° C., at ambient pressure.

Suitable solvent systems are, water, $C_{1-5}$ alcohols, such as methanol, ethanol, n-propanol, iso-propanol, n-butanol, iso-butanol, sec-butanol, tert-butanol, tert-amyl alcohol and iso-amyl alcohol and a mixture thereof. The amount of water in the $C_{1-5}$ alcohol solvent system will vary depending on the alcohol used. Preferably the solvent contains from 0–75% water (v/v), more preferably from 20–70% water (v/v), more preferably from 44–66% water. A particularly preferred solvent system is an aqueous ethanol solvent containing from 44–66% water.

When elevated temperature is used, it is preferred to remove the solvent from the column, slurry or suspension after the maximum concentration of sialyloligosaccharide is reached, followed, by cooling of the separated solvent. Upon cooling of the separated solvent, solubilized lactose will crystallize out and can be removed from the solvent containing the sialyloligosaccharide, by conventional means such as filtration, centrifugation and decanting.

An aqueous solution of lactose, such as the mother liquor obtained by crystallizing lactose, can also be treated with a solvent at elevated temperature, preferably from 60° to 75° C., more preferably from 68° to 72° C., followed by cooling and precipitation of the lactose from solution. Separation of the precipitated lactose from the solvent and concentration of the solvent provides the sialyloligosaccharide.

The aqueous solution of lactose and the solvent are mixed in a ratio of about 1:3 v/v, preferably 1:2 v/v more preferably 1:1 v/v. A suitable solvent for treating an aqueous solution of lactose is a $C_{1-5}$ alcohol.

The separated solvent, or column eluent can be concentrated to yield high purity sialyloligosaccharide. This material can be further purified by recrystallization from aqueous ethanol and a suitable organic solvent, to remove lactose impurity.

In another embodiment to the column, slurry or suspension treatment technique, a portion of the extraction solvent can be removed and passed through an anion exchange column and the solvent returned to the system. In this fashion, the sialyloligosaccharide can be concentrated on the anion exchange column. The solvent to be passed through the anion exchange resin can be removed continuously or batch wise.

Once the anion exchange column has been saturated with sialyloligosaccharide, the column can be removed from the system and purged to obtain sialyloligosaccharide. A suitable purging solution is 120 mM LiOAc. Generally from 2 to 5, preferably 4 column volumes of purging solution are used to remove the negatively charged materials from the anion exchange resin, performed at ambient temperature. Suitable anion exchange resins, contacting conditions and purging conditions have been previously described above.

Sialyloligosaccharides may also be extracted from whey waste streams using supercritical $CO_2$ extraction techniques, in a method analogous to the methods used to extract caffeine from coffee beans. A technique for the extraction of caffeine from coffee beans using moist supercritical $CO_2$ is described in U.S. Pat. Nos. 3,806,619 and 4,260,639. In general, the supercritical $CO_2$ extraction method comprises contacting lactose or an aqueous solution of lactose with supercritical $CO_2$, under conditions to effect solubilization of sialyloligosaccharides by the supercritical $CO_2$. The supercritical $CO_2$, containing sialyloligosaccharides is separated from the lactose or aqueous solution of lactose, then the $CO_2$ is removed by evaporation, leaving behind the extracted sialyloligosaccharides.

Other features of the invention will become apparent in the course of the following description of exemplary embodiments which are given for illustration of the invention and are not intended to be limiting thereof.

EXAMPLE 1

500 pounds of edible lactose (available from Land O'Lakes Dairy) were dissolved in 2,000 L of water at about ambient temperature. Particulate material is removed by passing the solution through a 5 μm filter. The solution was passed over 15 L of DOWEX 50×8 cation exchange resin. The eluent was passed over 15 L of DOWEX 1×8 anion exchange resin. The resin was then washed with water, to remove any residual lactose, then with 10 column volumes of 50 mM NaOAc. The NaOAc eluent is concentrated and diafiltered with 6 column volumes of water by reverse osmosis to desalt (using a 400 Dalton cut-off membrane at 400 PSIG. 10 L of a solution containing 55 grams of sialyloligosaccharide was obtained.

EXAMPLE 2

The solution of Example 1 was loaded onto a 76×36 cm column containing 45 L of DOWEX 1×2 resin and eluted with 190 L 120 mM NaOAc, at a rate of 55 mL/min. 6' sialyllactose eluted after 40 to 47 h, while 3'sialyllactose eluted after 48 to 55 h. The fractions containing the specific sialyloligosaccharides are pH adjusted to 4.8–5.3±0.1, then concentrated and desalted by diafiltration with 10 column volumes of water. The fractions are then adjusted to pH of 8.25. The fractions are concentrated to about 200 mg/mL by rotary evaporation, passed through a 0.2 μm filter and diluted with four volumes of EtOH and 13.3 volumes of acetone under vigorous agitation to form a suspension. The suspension is cooled to about 4° C., and the solid are isolated by centrifugation, followed by washing with acetone.

EXAMPLE 3

1 Pass lactose columns 5 g of lactose (from Land O'Lakes Dairy) containing about 1.5 mg of 3'-sialyllactose was placed in a column and washed with 10 mL of solvent, either 66% aq EtOH or 45% aq EtOH at either 4° C. or Room Temp (RT). The wash was analyzed, for the percent of 3'sialyllactose which is removed, by HPLC using peak integration.

| Conditions | % Yield 3'-SL |
| --- | --- |
| 45% RT | 6.26 |
| 45% 4° C. | 3.7 |
| 66% RT | 2 |
| 66% 4° C. | 1.4 |

EXAMPLE 4

Re-circulating 5 g lactose column 5 g of lactose (from Land O'Lakes Dairy) containing about 1.5 mg of 3'-sialyllactose was placed in a column and washed with a pump circulating the wash (66% EtOH/4° C.). After 14 h, the wash was analyzed.

| Conditions | % Yield 3'-SL |
| --- | --- |
| Circ. 66% 4° C. | 17% |

EXAMPLE 5

Slurry Extractions 5 g of lactose (from Land O'Lakes Dairy) containing about 1.5 mg of 3'-sialyllactose was put in a flask and stirred in 20 mL solvent, either 66% aq EtOH or 45% aq EtOH at either 4° C. or Room Temp (RT). The lactose never quite got into solution, but the 3'-sialyllactose was dissolved. The supernatant was analyzed:

| Conditions | % Yield 3'-SL |
| --- | --- |
| 45% RT | 33 |
| 45% 4° C. | 9.6 |
| 66% RT | 18 |
| 66% 4° C. | 22.3 |

EXAMPLE 6

Heated Extraction 5 g of lactose (from Land O'Lakes Dairy) containing about 1.5 mg of 3'-sialyllactose was put in a flask and heated to get the lactose into 150 mL of 66% EtOH, then cooled with an additional 100 mL of RT 66% EtOH and stirred overnight at 4° C. A precipitate quickly crashed out of solution. The supernatant was analyzed:

| Conditions | % Yield 3'-SL |
| --- | --- |
| heated/cooled 66% EtOH | 70.5 |

EXAMPLE 7

Heated Extraction-Varying Conditions 6.4 g lactose (from Land O'Lakes Dairy) (~1.92 mg of 3'-SL) was heated to 70° C. to get into a 20 mL solution of water. Then the concentrated lactose solution was stirred for 16 hr at either 4° C. or room temp (RT) and various EtOH concentrations to precipitate lactose and retain 3'-SL.

| Conditions | % Yield 3'-SL |
| --- | --- |
| 0% EtOH RT | 100 |
| 33% EtOH RT | 32 |
| 50% EtOH RT | 36 |
| 66% EtOH RT | 7 |
| 0% EtOH 4° C. | 63 |
| 33% EtOH 4° C. | 50 |
| 50% EtOH 4° C. | 26 |
| 66% EtOH 4° C. | 24 |

EXAMPLE 8

Heated Extraction-Varying Conditions Longer Contact Time 60 g lactose (from Land O'Lakes Dairy) (~18 mg of 3'-SL) was dissolved in 100 mL of $H_2O$ by heating at 70° C. for about 10 min. Equal sized aliquots were placed under various conditions and stirred for about 36 h. Samples were analyzed by HPLC.

| Conditions | % Yield 3'-SL |
| --- | --- |
| 0% EtOH RT | 100 |
| 33% EtOH RT | 18.3 |
| 50% EtOH RT | 8.3 |
| 66% EtOH RT | 8.7 |
| 0% EtOH 4° C. | 100 |
| 33% EtOH 4° C. | 27.6 |
| 50% EtOH 4° C. | 15.2 |
| 66% EtOH 4° C. | 100 |

EXAMPLE 9

Mother Liquor—Heated Experiment 100 mL of mother liquor was heated at 70° C. for approx 10 min. then cooled to 4° C. with 2× volume of 95% EtOH. Allowed to stir for 36 hours. Sample was analyzed on HPLC for 3'-SL content.

| Conditions | % Yield 3'-SL |
| --- | --- |
| ML 0% EtOH at 4° C. | 33 |

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of processing a cheese processing waste stream comprising:

i) contacting a cheese processing waste stream with a solvent and extracting a sialyloligosaccharide with said solvent;

ii) separating a sialyloligosaccharide containing solvent from said cheese processing waste stream; and iii) isolating a sialyloligosaccharide from said sialyloligosaccharide containing solvent.

2. The process of claim 1, wherein said solvent is selected from the group consisting of water, $C_{1-5}$ alcohol and a mixture thereof.

3. The process of claim 1, wherein said cheese processing waste stream is lactose.

4. The process of claim 1, wherein said cheese processing waste stream is the mother liquor obtained by crystallizing lactose from cheese whey.

5. The process of claim 4, wherein said contacting is conducted at a mother liquor to solvent ratio of 1:2 (v/v).

6. The process of claim 4, wherein said contacting is conducted at a temperature of from 60° to 75° C.

7. The process of claim 1, wherein said solvent is 44–66% (v/v) aqueous ethanol.

8. The process of claim 1, wherein said solvent is contacted with said cheese processing waste stream at a temperature of from 20° to 80° C.

9. The process of claim 1, wherein said solvent is contacted with said cheese processing waste stream at a temperature of from 40° to 45° C.

10. The process of claim 1, wherein said solvent is separated from said cheese processing waste stream at a temperature of from 20° to 80° C.

11. The process of claim 1, wherein said solvent is separated from said cheese processing waste stream at a temperature of from 40° to 45° C.

12. The process of claim 1, wherein said contacting is conducted as a suspension of said cheese processing waste stream and said solvent.

13. The method of claim 1, wherein said sialyloligosaccharide is selected from the group consisting of 3' sialyllactose, 6' sialyllactose, 6'sialyllactosamine and a mixture thereof.

14. The method of claim 1, wherein said sialyloligosaccharide is 3' sialyllactose.

15. The method of claim 1, wherein said sialyloligosaccharide is 6' sialyllactose.

16. The method of claim 1, wherein said sialyloligosaccharide is 6' sialyllactosamine.

* * * * *